Sept. 3, 1929.    H. FORD    1,726,815
BRAKE OPERATING ROCKSHAFT
Filed Oct. 10, 1928
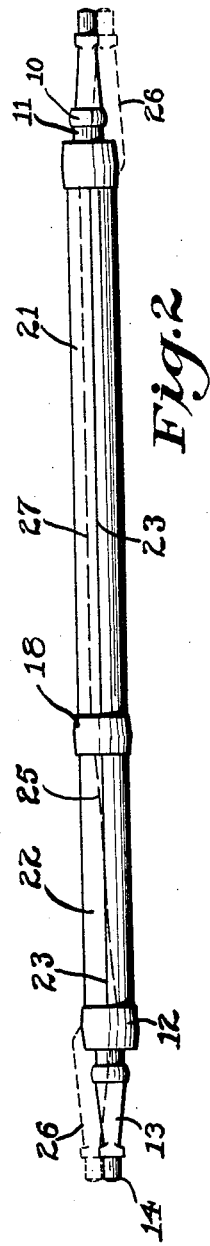
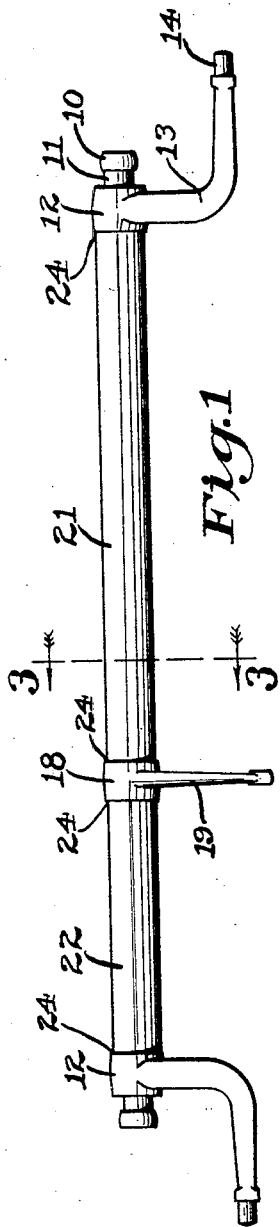
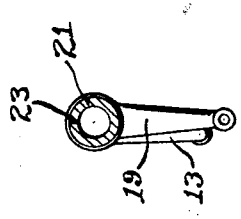
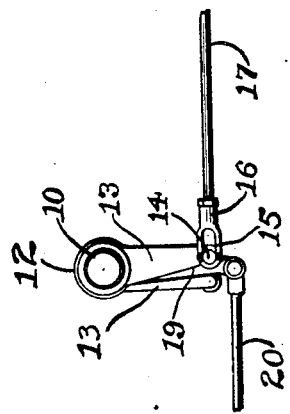
INVENTOR.
Henry Ford
BY  C. R. Halbert.
    E. L. Davis.
        ATTORNEYS.

Patented Sept. 3, 1929.

1,726,815

UNITED STATES PATENT OFFICE.

HENRY FORD, OF DEARBORN, MICHIGAN.

BRAKE-OPERATING ROCKSHAFT.

Application filed October 10, 1928. Serial No. 311,493.

The object of my invention is to provide a brake operating rockshaft of simple, durable, and inexpensive construction.

Still a further object of my invention is to provide a brake operating rockshaft which will equalize automatically whereby the brakes at either side of the vehicle will be applied with substantially the same or equal pressure even though greater movement or greater pressure is required to operate the brakes on one side than the other.

Still a further object of my invention is to provide a brake operating rockshaft having arms at either end thereof designed to operate the brakes at the two sides of the vehicle and having a third arm intermediate of the ends of the shaft adapted to be operatively connected with a brake pedal or lever, and to so construct this shaft that it may twist somewhat from end to end to thereby permit the shaft to apply an equalized pressure to the brakes at either side of the vehicle despite inaccurate adjustment or construction of said brakes.

Still a further object of my invention is to provide a brake operating rockshaft having an arm at each end adapted to connect it with the brake and another arm intermediate of the ends of the shaft adapted to be connected with an operating member, and to provide hollow shaft sections rolled from sheet metal between said arms, the adjacent or butting edges of said hollow shaft section being free to move on each other whereby slight twisting of the shaft may be permitted to secure equalization of the brakes when necessary.

With these and other objects in view, my invention consists in the arrangement, construction, and the combination of the various parts of my improved device, as described in the specification, claimed in the claims, and illustrated in the accompanying drawings, in which Figure 1 shows an elevation of a brake operating rockshaft constructed in accordance with my invention.

Figure 2 shows a top or plan view of the brake operating rockshaft illustrated in Figure 1.

Figure 3 shows a vertical sectional view taken on the line 3—3 of Figure 1, and

Figure 4 shows a diagrammatical end view of the shaft illustrated in Figure 1, the parts being illustrated in the position they would assume if unequal movement were required to operate the brakes on the opposite sides of the vehicle.

Referring to the accompanying drawings, I have used the reference numeral 10 to indicate the balls mounted on the shanks 11 at each end of my improved brake operating rockshaft and which are designed to enter journals or bearings in the frame or any other suitable part of an automotive vehicle. These shanks 11 are formed integral with the bosses 12 and the inner ends of the L shaped brake operating arms 13. The ends of these arms 13 are machined at 14 to form pins designed to enter the holes 15 in the forks 16 on the ends of the brake rods 17.

A boss 18 is disposed at the upper end of the arm 19 which is designed to have its lower end connected with a link 20 which in turn is intended to be connected to an operating member such as a foot pedal or hand lever.

The bosses 12 are each connected to the boss 18 by tubular shaft sections 21 and 22. These shaft sections are constructed as is illustrated in Figure 3 by rolling a strip of flat stock to form a tube, the rolling being done so that the edges 23 of the shaft material just butt against each other as is illustrated in said Figure 3. The ends of the shaft sections 21 and 22 are welded at 24 to the bosses 12 and 18.

It will be seen that if the brakes on the opposite sides of the car are so constructed or are so adjusted that unequal movement of the two rods 17 is required to operate the brakes equally, then due to the tubular construction of the shaft 21 and 22 and the fact that the edges of the material are not fastened together, these shafts will twist somewhat so that the arm 13 on one side may move further than the arm 13 on the other side and consequently both brakes may be applied although different movement or pressure is required therefor. This twisting of the shaft to permit this equalizing of the brake pressure is illustrated both in Figures 2 and 4.

In Figure 2 it will be noted that the shaft is very diagrammatically illustrated to show how the shaft will twist in case more movement is required to operate the right hand brake than to operate the left hand brake. In this case the shaft is illustrated in the position it would assume under such circumstances after the both brakes start to hold. In other words the left hand arm 13 is shown in its dotted line position which it would assume if the left hand brake applied first and then the shaft further operated to twist the shaft 22 around as is illustrated by the dotted line 25. When the shaft has twisted sufficiently so that the right hand brake will commence to be operated then the right hand arm 13 will be in position indicated by the dotted line 26 and the shaft 21 will not yet be twisted as is illustrated by the dotted line 27.

In connection with this Figure 2, it will be noted that the shaft is diagrammatically illustrated merely to better illustrate the twisting of the shaft to equalize the brake structure and no attempt is made to further illustrate the slight twisting of the shaft which would occur on both ends of the shaft after it has twisted sufficiently to equalize the brake pressure.

It is obvious that there will always be some slight difference in the pressure on the brakes on the two sides due to the fact that more energy will be applied to the brake on the side requiring the shortest movement to operate the brakes. This difference in pressure in practice is relatively small, as has been demonstrated by attempting to slide the wheels on one side only by means of the brakes.

Even with the brake operating links 17 adjusted so that they were of different lengths, it was impossible to slide the wheels so that they would commence to slide at different times when this difference in the length of the brake rods was less than would normally occur either in connection with adjustment of the brakes or unequal wear. In other words this difference in brake pressure was imperceptible in practical tests. Furthermore, this difference in brake pressure would eventually lead to equalizing the movement required on the two brakes because there would be very slightly greater wear on one brake than on the other.

In Figure 4, an end view of the shaft is shown to diagrammatically illustrate the displacement of the parts due to the twisting of these shafts due to unequal strains caused by inequalities in the brake operation. This view being similar to Figure 2 in its disclosure except that the arms 13 are strained so as to cause the shaft to be twisted in the opposite direction.

Many advantages result from the use of my improved shaft amongst which it should be pointed out that I secure the advantages of equalization of the brakes without adding materially to the cost of an ordinary rockshaft. That is to say that this rockshaft may be installed in a vehicle with exactly the same mounting that would be used in connection with an ordinary rigid rockshaft and no extra parts of any kind are required so that I secure the advantages of equalizer at practically no additional cost. Still a further advantage results in that this shaft is very readily made, as the arms 13 and 19 are relatively simple forgings and require a relatively small amount of machining while at the same time the shafts 21 and 22 are relatively easy to construct and may be attached to the bosses 12 and 18 by a simple flash welding operation.

Some changes may be made in the arrangement, construction, and combination of the various parts of my improved brake rockshaft without departing from the spirit of my invention, and it is my intention to cover by my claims such changes as may reasonably be included within the scope thereof.

I claim as my invention:

1. In a brake operating rockshaft, a pair of brake operating arms, an arm disposed between said brake operating arms and adapted to be connected to the brake operating member, and shaft members connected between said arms, said shaft members being constructed to permit twisting thereof to thereby equalize the pressure applied from the third arm to the first two arms.

2. In a device of the character described, a pair of shaft sections formed by rolling flat stock to tubular form with the edges abutting against each other, and arms integrally united with the adjacent ends of said shaft sections and with the distant ends of said shaft sections.

3. In a device of the character described, a pair of shaft sections formed from flat stock rolled to tubular form with their adjacent edges abutting but not secured together, arm members having bosses at one end thereof integrally united with the ends of said shaft sections, one of said bosses being disposed between said shaft sections in such position that said sections are aligned with each other and may thereby form a rockshaft capable of twisting under torque stresses to thereby equalize brake pressures.

4. In a device of the character described, a pair of shaft sections formed by rolling flat stock to tubular form with the adjacent edges abutting against each other but not secured to each other, and arms welded between said shaft sections and at the distant ends thereof whereby said sections and arms together may form an operating shaft capable of twisting under torque stresses sufficiently to equalize brake pressures.

September 20, 1928.

HENRY FORD.